United States Patent
Doom et al.

(10) Patent No.: US 10,545,040 B2
(45) Date of Patent: Jan. 28, 2020

(54) FLOWMETER AND ORIFICE PLATE CARRIER ASSEMBLY THEREFOR

(71) Applicant: Daniel Measurement and Control, Inc., Houston, TX (US)

(72) Inventors: Ronald Gwen Doom, Spring, TX (US); Thomas Henry Loga, Sugar Land, TX (US); Gregory Theron Jay, Cypress, TX (US); Mark O'Daniel, Sugar Land, TX (US); Anthony Eugene Carter, Cameron, TX (US); David Bruce Stevens, Katy, TX (US)

(73) Assignee: Daniel Measurment and Control, Inc., Houston, TX (US)

( * ) Notice: Subject to any disclaimer, the term of this patent is extended or adjusted under 35 U.S.C. 154(b) by 6 days.

(21) Appl. No.: 15/887,610

(22) Filed: Feb. 2, 2018

(65) Prior Publication Data

US 2019/0242732 A1    Aug. 8, 2019

(51) Int. Cl.
  *G01F 1/42* (2006.01)

(52) U.S. Cl.
  CPC ..................... *G01F 1/42* (2013.01)

(58) Field of Classification Search
  CPC ................. G01F 1/37; G01F 1/24; G01F 1/42
  See application file for complete search history.

(56) References Cited

U.S. PATENT DOCUMENTS

| | | | |
|---|---|---|---|
| 3,419,045 A | 12/1968 | King, Jr. | |
| 4,399,708 A | 8/1983 | Van Scoy | |
| 4,478,251 A | 10/1984 | Sanchez et al. | |
| 5,085,250 A | 2/1992 | Kendrick | |
| 5,181,542 A | 1/1993 | Wass et al. | |
| 5,305,796 A | 4/1994 | Klak | |
| 5,419,372 A | 5/1995 | Wass et al. | |
| 5,617,899 A | 4/1997 | Linton et al. | |
| 7,461,563 B1 * | 12/2008 | Peng | G01F 1/42 73/861.52 |
| 7,837,176 B2 | 11/2010 | Loga et al. | |
| 8,167,268 B2 | 5/2012 | Loga et al. | |
| 9,841,303 B2 * | 12/2017 | Crouch | G01F 1/42 |
| 10,036,512 B2 * | 7/2018 | Loga | F17D 3/10 |
| 2007/0186987 A1 * | 8/2007 | Loga | F16K 3/30 138/44 |
| 2010/0229988 A1 * | 9/2010 | Loga | F15D 1/0005 138/44 |

OTHER PUBLICATIONS

European Patent Application No. 19155147.2 Extended European Search Report dated Jun. 21, 2019 (9 pages).

* cited by examiner

*Primary Examiner* — Jewel V Dowtin
(74) *Attorney, Agent, or Firm* — Conley Rose, P.C.

(57) ABSTRACT

A flowmeter includes an orifice plate assembly having a carrier that includes an aperture, an annular rim disposed about the aperture, and an annular ledge extending radially inward from the rim to the aperture. An orifice plate and annular seal are disposed within the annular rim. The plate engages the ledge and is retained on the carrier by a retaining ring and the energized annular seal. The seal is disposed in a seal gland formed between the orifice plate, the carrier, and the ring member, and sealingly engages at least one surface of each.

23 Claims, 5 Drawing Sheets

FLOWMETER AND ORIFICE PLATE CARRIER ASSEMBLY THEREFOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure relates generally to flowmeters for measuring fluid flow rates through pipes or other conduits. More particularly, it relates to a flowmeter known as an orifice fitting, a meter which employs an orifice plate to help determine fluid flow rates. Still more particularly, the disclosure relates to an orifice plate carrier for use in orifice fittings.

Fluid flow rate is the quantification of bulk fluid or gas movement, typically measured as volumetric and mass flow rates. The ability to measure reliably and accurately fluid flow rates serves an important function in a variety of processes and industries (e.g., chemical processing, oil and gas transport and production, etc.). An orifice fitting is one of many devices that may be used to measure volumetric or mass flow rate of fluids flowing through a pipe or conduit.

An orifice fitting typically employs an assembly that includes a thin plate having a central orifice that is smaller in diameter than the diameter of the conduit in which the plate is disposed. The orifice plate is retained in a plate carrier, which is, in turn, supported and aligned within the flow bore of the orifice fitting. The orifice fitting determines the mass fluid flow rate through the conduit via calculations that employ the pressure differential that is measured across the orifice plate, as well as other parameters.

When using an orifice fitting to measure fluid flow, many factors must be considered in order to obtain accurate flow values, including effective sealing, such that all the fluid flow passes through the central aperture of the orifice plate, accurate positioning of the orifice plate so it is concentric with respect to the through bore, and accurate positioning of the orifice plate face so it is held perpendicular to the direction of fluid flow.

An effective seal between the orifice plate and the orifice plate carrier is an important consideration as it directs flow through the orifice plate's central aperture. Leakage around the orifice plate's central aperture will result in inaccurate flow values determined by the orifice fitting as the magnitude of the pressure drop across the orifice plate is reduced.

Overall, due to the demanding requirements to achieve accurate flow values, particularly in severe conditions, conventional orifice plate assemblies are complicated, being both difficult to manufacture and demanding to assemble and to properly secure in the flowmeter body. Thus features for an orifice plate assembly that enhance ease of manufacturing, assembly and provide continually reliable positioning are desirable. At least some convention orifice plate carrier assemblies include an orifice plate carrier in which the orifice plate is secured with o-ring seals on each side of the plate. A number of snap rings or clips are used to secure the orifice plate within the carrier and to maintain the seals in proper sealing engagement with the orifice plate. Centering tabs or ears are frequently required to position and align the orifice plate properly within the carrier as described, for example, in U.S. Pat. No. 7,461,563.

BRIEF SUMMARY OF DISCLOSURE

Disclosed is a flowmeter and components configured to measure precisely various characteristics of a fluid flowing in a pipe, as well as a method of making such a meter and components. The meter may include a body having a through passage for conveying fluid, and an orifice plate assembly disposed within the through passage.

In some embodiments, the orifice plate assembly comprises an orifice plate carrier having an aperture, an annular rim disposed about the aperture, and an annular ledge extending radially inward from the annular rim to the aperture. The carrier may be made by investment casting for precision and ease. The orifice plate includes a first facing surface engaging the annular ledge of the carrier, a second facing surface facing away from the annular ledge, and an edge facing the annular rim. An annular seal, such as an o-ring, having a central opening is disposed within the annular rim and engages the second facing surface of the orifice plate and engages the annular rim of the carrier. A retaining ring member having an annular flange and an annular lip axially extending from the annular flange is positioned such that the annular lip extends within the central opening of the o-ring seal, wherein the o-ring seal is retained between the second facing surface of the orifice plate, the annular lip of the ring member, the annular flange of the ring member, and the annular rim of the carrier.

In some embodiments, the intersection of the annular lip of the ring member with the annular flange of the ring member forms an acute angle, and in some embodiments, the annular lip has a maximum outer diameter that is greater than the relaxed diameter of the central opening of the o-ring. The ring member may be coupled to the carrier by radial forces applied to the ring member by the o-ring when the o-ring is disposed between the annular lip of the ring member and the annular rim of the carrier. In some embodiments, the first facing surface of the orifice plate is held against the annular ledge by axial forces applied by the o-ring when the o-ring is disposed between the ring member and the second facing surface of the orifice plate.

In some embodiments, the edge of the orifice plate has an outer diameter that is greater than the diameter of the aperture of the carrier, and less than the diameter of the annular rim of the carrier.

In some embodiments the carrier includes a first side and a second side, wherein the annular ledge is formed on the first side, and wherein the second side of the carrier includes an annular groove configured to receive an annular seal for sealing the assembly on the downstream side of the meter body.

In some embodiments, the annular lip of the ring member includes an outer diameter, and wherein the o-ring seal is elastomeric with its central opening defining a relaxed diameter before the annular lip is disposed into the central opening, and wherein the outer diameter of the annular lip is greater than the relaxed diameter.

In some embodiments, the outer diameter of the orifice plate, as defined by the plate's edge, is greater than the diameter of the aperture of the carrier, and in some embodiments, the annular flange of the ring member extends beyond the annular rim of the carrier. The annular lip of the ring member may include an outer diameter that is less than the outer diameter of the orifice plate.

In some embodiments, the ring member includes a central aperture having a diameter that is substantially equal to the diameter of the aperture in the carrier. A second annular seal may be included in an annular seal groove that is formed on the downstream facing side of the carrier, the side that is opposite the side having the annular ledge. The diameter of the groove securing the second annular seal may be equal to the diameter of the annular seal gland retaining the o-ring seal that is positioned on the opposite side of the carrier.

Also disclosed is an orifice plate carrier assembly comprising: a carrier body having an aperture, an annular shoulder disposed about the aperture, and an annular ledge extending radially outward from the aperture toward the shoulder. An orifice plate is disposed within the annular shoulder and includes a first facing surface engaging the annular ledge, a second facing surface facing away from the annular ledge, and an edge that faces the annular shoulder of the carrier. A ring member is coupled to the carrier wherein the orifice plate is retained between the carrier and the ring member. A first annular seal is disposed within an annular seal gland formed between the carrier and the ring member, the first annular seal having a central opening and having a first portion that engages the orifice plate, a second portion that engages the carrier, and a third portion that engages the ring member.

In some embodiments, the ring member comprises an annular flange and an annular lip extending from the annular flange, the ring member being positioned such that the annular lip is disposed within the central opening of the first annular seal; and wherein the first annular seal is retained within an annular seal gland defined by the second facing surface of the orifice plate, the annular lip of the ring member, the annular flange of the ring member, and the annular rim of the carrier.

In some embodiments, when viewed in cross section, the seal gland is formed to include at least one acute angle. In some embodiments, the annular lip of the ring member includes an outer diameter, and wherein the first annular seal is elastomeric with the central opening defining a relaxed diameter before the annular lip is disposed into the central opening, and wherein the outer diameter of the annular lip is greater than the relaxed diameter of the central opening of the first annular seal.

In some embodiments, the annular flange of the ring member extends beyond the annular shoulder of the carrier body, and in some embodiments, the annular lip of the ring member includes an outer diameter, and wherein the outer diameter of the ring member is less than the outer diameter of the orifice plate.

In some embodiments, the carrier body comprises a first side and a second side and the annular ledge is formed on the first side, wherein the carrier assembly also includes a second annular seal disposed in an annular seal groove that is formed on the second side of the carrier body. In some embodiments, the diameter of the annular seal groove is generally equal to the diameter of the annular seal gland, and in other embodiments, the diameter of the annular seal groove is less than the diameter of the annular seal gland.

In some embodiments, the orifice plate carrier assembly includes a ring member having an outer cylindrical surface, and wherein the seal member engages the outer cylindrical surface, and at least one annular surface of the ring member, and at least one annular surface of the carrier. In some embodiments, the seal gland includes surfaces that form at least one obtuse angle when viewed in cross section.

Also disclosed are methods of making an orifice plate carrier. One such method comprises: placing an orifice plate into engagement with an annular ledge in a carrier body, the carrier body having an aperture therethrough and having, on a first side, an annular rim and the annular ledge that extends radially inward from the annular rim, wherein the annular ledge and annular rim are disposed concentrically about the aperture. A first annular elastomeric seal is positioned about an annular lip of a ring member, and the annular lip of the ring member is positioned within the annular rim of the carrier body. The method further includes, using the first annular seal, sealing between the ring member and the carrier body and between the ring member and the orifice plate, and positioning a second annular elastomeric seal in an annular groove on a second side of the carrier body opposite the first side.

The foregoing has outlined rather broadly features of exemplary embodiments in order that the detailed description that follows may be better understood. Additional features will be described hereinafter that form the subject of certain of the claims.

BRIEF DESCRIPTION OF THE DRAWINGS

For a detailed description of the various exemplary embodiments described herein, reference will now be made to the accompanying drawings in which.

DETAILED DESCRIPTION OF DISCLOSED EXEMPLARY EMBODIMENTS

The following discussion is directed to various exemplary embodiments of the invention. One skilled in the art will understand that the following description has broad application, and the discussion of any embodiment is meant only to be exemplary of that embodiment, and not intended to intimate that the scope of the disclosure, including the claims, is limited to that embodiment.

The drawing figures are not necessarily to scale. Certain features of the disclosed embodiments may be shown exaggerated in scale or in somewhat schematic form, and some details of conventional elements may not be shown, all in the interest of clarity and conciseness.

In the following discussion and in the claims, the terms "including" and "comprising" are used in an open-ended fashion, and thus should be interpreted to mean "including, but not limited to . . . ." Also, the term "couple" or "couples" means either an indirect or direct connection. Thus, if a first component couples or is coupled to a second component, the connection between the components may be through a direct engagement of the two components, or through an indirect connection that is accomplished via other intermediate components, devices and/or connections. In addition, the terms "axial" and "axially" generally mean along or parallel to a given axis, while the terms "radial" and "radially" generally mean perpendicular to the axis. For instance, an axial distance refers to a distance measured along or parallel to a given axis, and a radial distance means a distance measured perpendicular to the axis.

Figure 1:
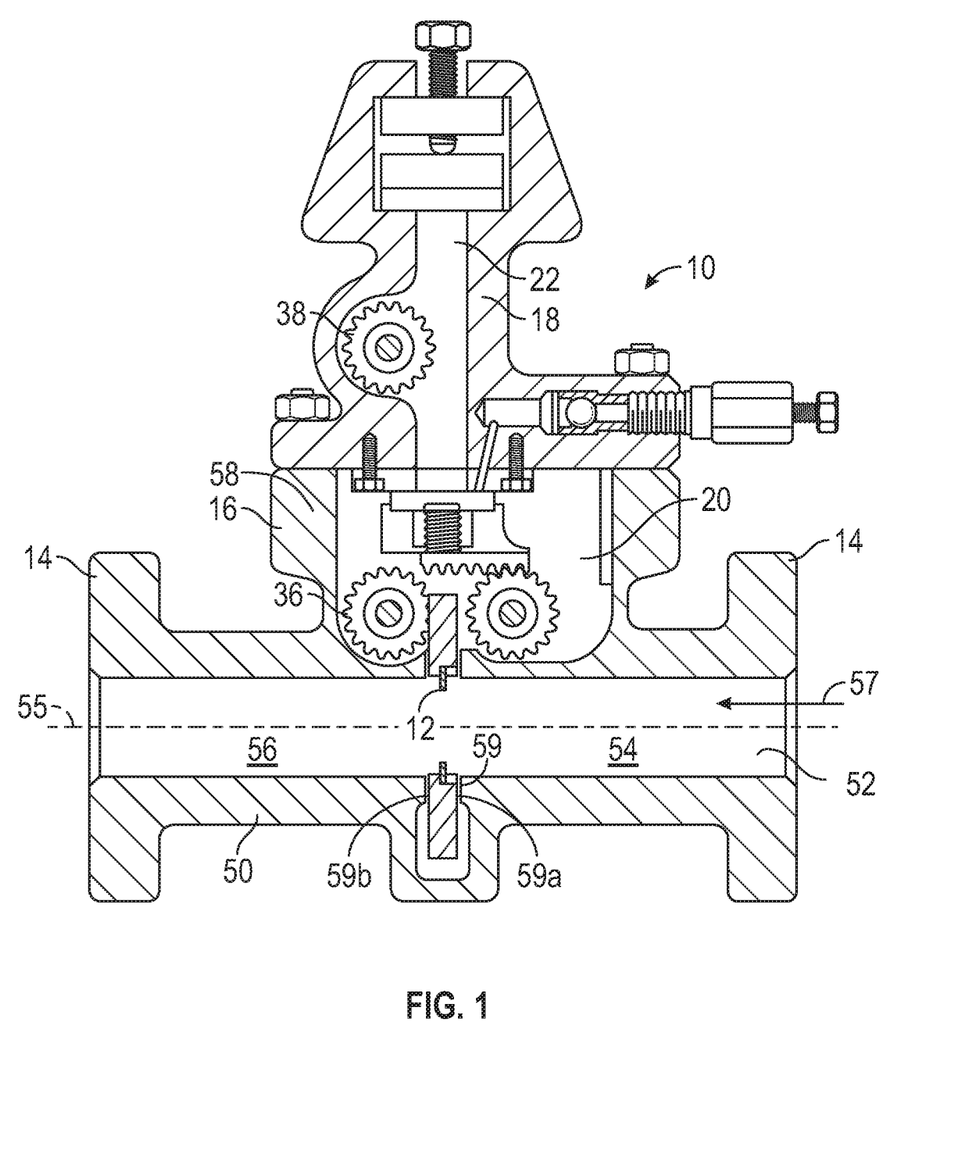
FIG. 1 is a cross-sectional view of an orifice fitting having an orifice plate assembly in accordance with principles described herein.

FIG. 1 illustrates a cross-sectional view of an orifice fitting 10 having an orifice plate assembly 12 in accordance with principles disclosed herein. As shown, orifice fitting 10 includes a lower portion 16 coupled to an upper portion 18. Lower portion 16 includes a tubular body or conduit 50. In the embodiment of FIG. 1, the fitting 10 includes a flange 14 disposed at one or both ends and includes a central housing 58 there between. Flanges 14 are used to couple orifice fitting 10 between sections of a pipeline. Conduit 50 further includes a through passage or axial flow bore 52 therethrough, having a central axis 55 and upstream and downstream regions 54 and 56, respectively. A fluid may flow through axial flow bore 52 from upstream region 54 to downstream region 56 generally in the direction indicated by arrow 57. Housing 58 encloses a lower chamber 20 with a lower drive 36, having a gear shaft and pinions, disposed therein. Upper portion 18 of orifice fitting 10 encloses an upper chamber 22 with an upper drive 38, also having a gear shaft and pinions, disposed therein.

Orifice plate carrier 60, described in more detail below, may be raised and lowered within orifice fitting 10 by operating lower drive 36 and upper drive 38. In FIG. 1, orifice plate carrier 60 is shown in the measurement position, fully inserted into orifice fitting 10. Lower portion 16 of fitting 10 further includes a plate carrier guide 59 which serves as a guide to assist in properly locating, aligning, and positioning orifice plate assembly 12 and orifice plate 70 within orifice fitting 10. Specifically, carrier guide 59 is formed by a radial cut of axial flow bore 52 and includes an upstream sealing surface 59a and a downstream sealing surface 59b. In the measurement position, orifice plate assembly 12 rests perpendicular to the direction of fluid flow, indicated by arrow 57, and in substantial concentric alignment with axial flow bore 52 between upstream sealing surface 59a and downstream sealing surface 59b.

Figure 2:
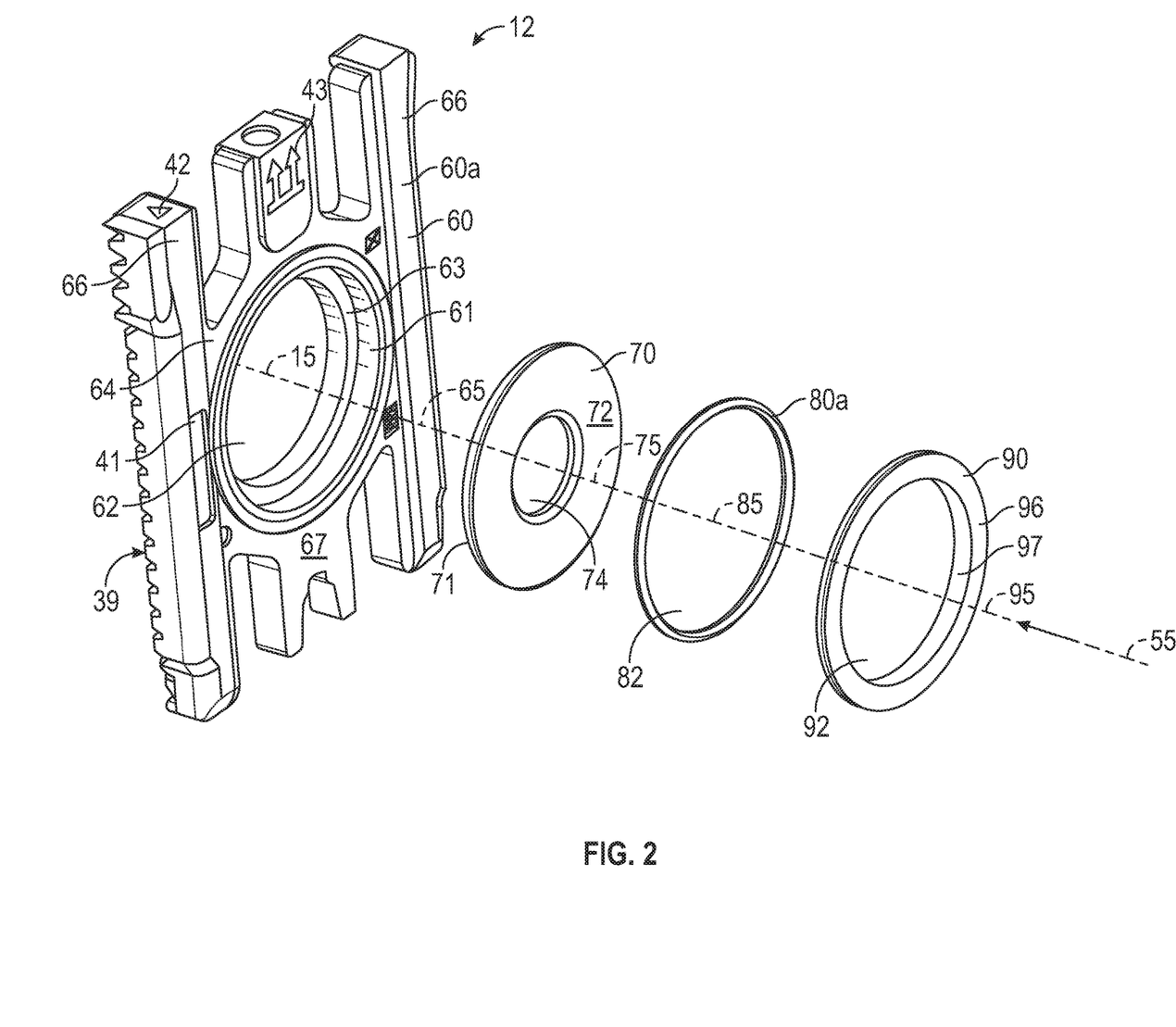
FIG. 2 is a perspective view of the orifice plate assembly of FIG. 1 and, in particular, showing the upstream face of the orifice plate assembly.
Figure 3:
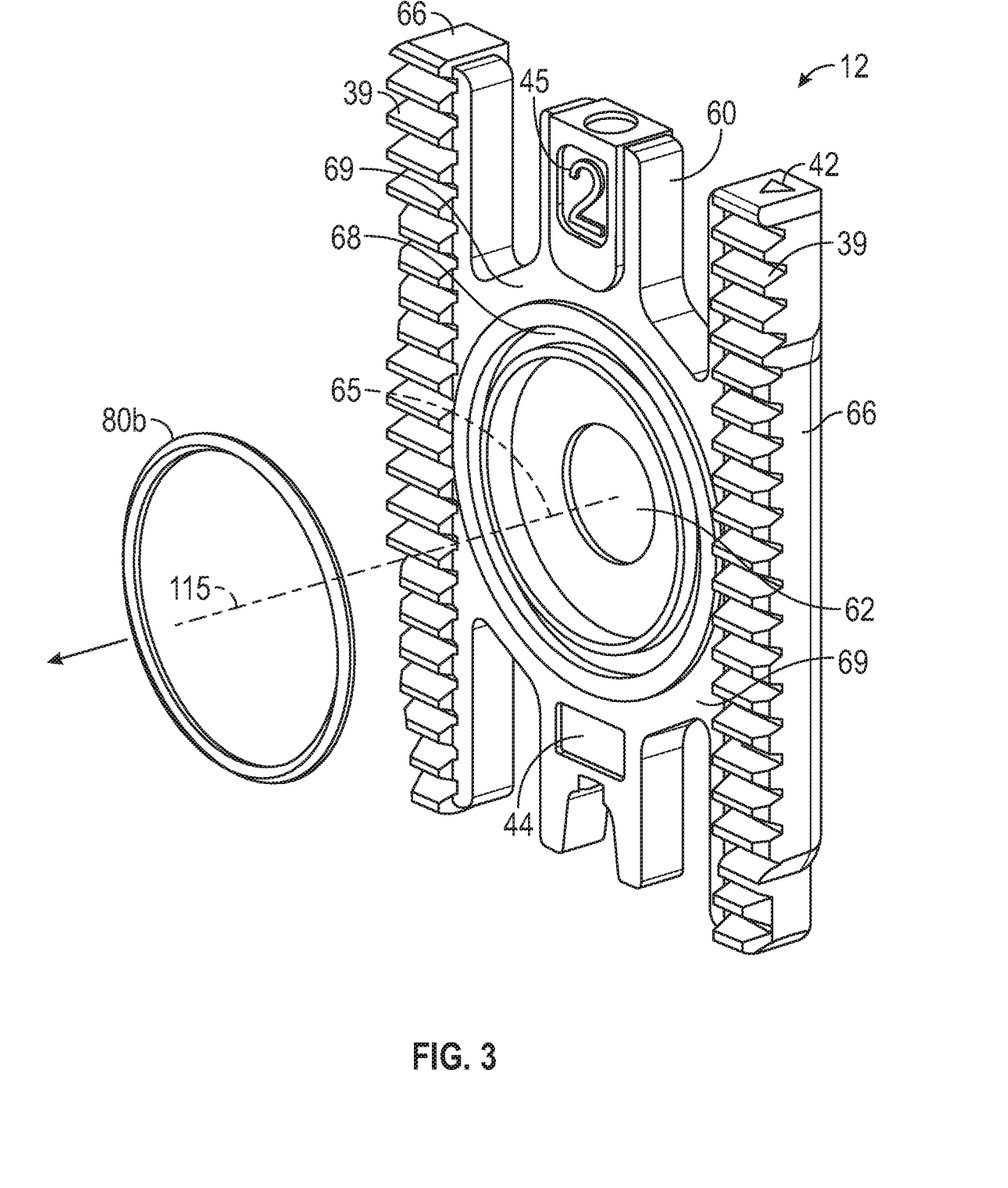
FIG. 3 is a perspective view of the orifice plate assembly of FIG. 1, showing the downstream face of the orifice plate assembly.

Referring to FIG. 2, orifice plate assembly 12 includes a central axis 15 which is substantially aligned with flow bore axis 55 (FIG. 1) when orifice plate assembly 12 is disposed within the lower portion 16 of fitting 10, as described above. Orifice plate assembly 12 includes a carrier 60, orifice plate 70, an upstream o-ring seal 80a, a retaining ring 90, and a downstream o-ring seal 80b (FIG. 3). Each of the aforementioned components of orifice plate assembly 12 includes a through bore having a central axis aligned with central axis 15: axis 65 for orifice plate carrier 60, axis 75 for orifice plate 70, axis 85 for upstream upstream o-ring seal 80a, axis 95 for retaining ring 90, and axis 86 for downstream o-ring seal 80b.

Referring still to FIG. 2, carrier 60 has a generally rectangular body 60a that includes an upstream facing surface 67, a downstream facing surface 69, and a central portion 64 that is coupled between a pair of elongate legs 66. Each leg 66 includes a rack surface 39 on downstream surface 69 for engagement with lower and upper drives 36, 38 (FIG. 1) when the orifice plate assembly 12 is moved in order to position it in, or to remove it from, its measurement position in axial flow bore 52.

Carrier 60 further includes a central aperture 62 formed through the central portion 64 and aligned with axis 65 and having diameter $D_1$. Carrier 60 also includes annular rim 61 disposed about the central aperture 62 and having diameter $D_3$, and an annular ledge 63 that extends radially inward from the annular rim 61 to central aperture 62. Rim 61 is thus an annular step or shoulder that defines the outer terminus of the annular ledge 63, and annular ledge 63 extends readily inwardly to define aperture 62. Annular rim 61 and annular ledge 63 are coaxially aligned with axis 65. In at least some embodiments, orifice plate carrier 60 is investment cast from materials such as aluminum, stainless steel, polymer, etc.

Orifice plate carrier 60 further comprises embedded markings or instructional text to assist the operator during installation of orifice plate carrier 60 into orifice fitting 10 and to prevent the operator from installing orifice plate carrier 60 in the wrong orientation, for example, upside down or with the upstream face of orifice plate carrier 60 facing downstream region 56. In this exemplary embodiment, embedded markings or instructional texts 41, 42 and 43 provide instructional guidance concerning information such as fluid flow direction, and installation orientation, respectively. The instructional text 41, 42 and 43 may comprise words, letters, and/or symbols. For example, an arrow may be embedded to indicate the upper edge of orifice plate carrier 60, as shown. As another example, the phrase, "This face toward inlet," may be embedded to indicate the upstream face of orifice plate carrier 60.

Referring still to FIG. 2, orifice plate 70 is an annular member (i.e. washer shaped) having central axis 75, outer cylindrical edge 71 defining the plate's outer diameter $D_2$, an upstream facing surface 72, a downstream facing surface 73, and a central aperture or orifice 74 extending between surfaces 72, 73 and aligned with axis 75. Orifice 74 is formed to have a smaller opening in the upstream facing surface 72 than in the downstream facing surface 73, best shown in FIG. 4. In some embodiments, orifice plate 70 is made of stainless steel. Orifice plate 70 is disposed in carrier body 60a such that downstream facing surface 73 faces and engages ledge 63 of carrier 60. Rim 61 is concentric to and faces cylindrical edge 71 of orifice plate 70 and is in very close proximity thereto, rim 61 essentially centering orifice plate 70 within carrier body 60a. Central axis 75 is aligned with orifice plate assembly central axis 15, such that upstream facing surface 72 and downstream facing surface 73 are substantially perpendicular to the fluid flow direction 57 (FIG. 1). As best shown in FIG. 1, orifice plate 70 is positioned within carrier 60 with upstream facing surface 72 positioned axially adjacent to upstream region 54 and with downstream facing surface 73 positioned axially adjacent to downstream region 56.

Referring still to FIG. 2, upstream o-ring seal 80a includes a central opening 82 and is positioned such that its central axis 85 is aligned with orifice plate assembly central axis 15. In this exemplary embodiment, upstream o-ring seal 80a is circular in cross-section, but other embodiments may employ annular seals that have cross sections other than circular. In at least some embodiments, upstream o-ring seal 80a comprises an elastomer, such as rubber, and provides sealing contact between orifice plate upstream surface 72, rim 61 of carrier 60, and ring 90, as described in more detail below. Central opening 82 of seal 80a includes a relaxed diameter before the o-ring seal is stretched to engage the retaining ring 90, as described below.

Figure 4:
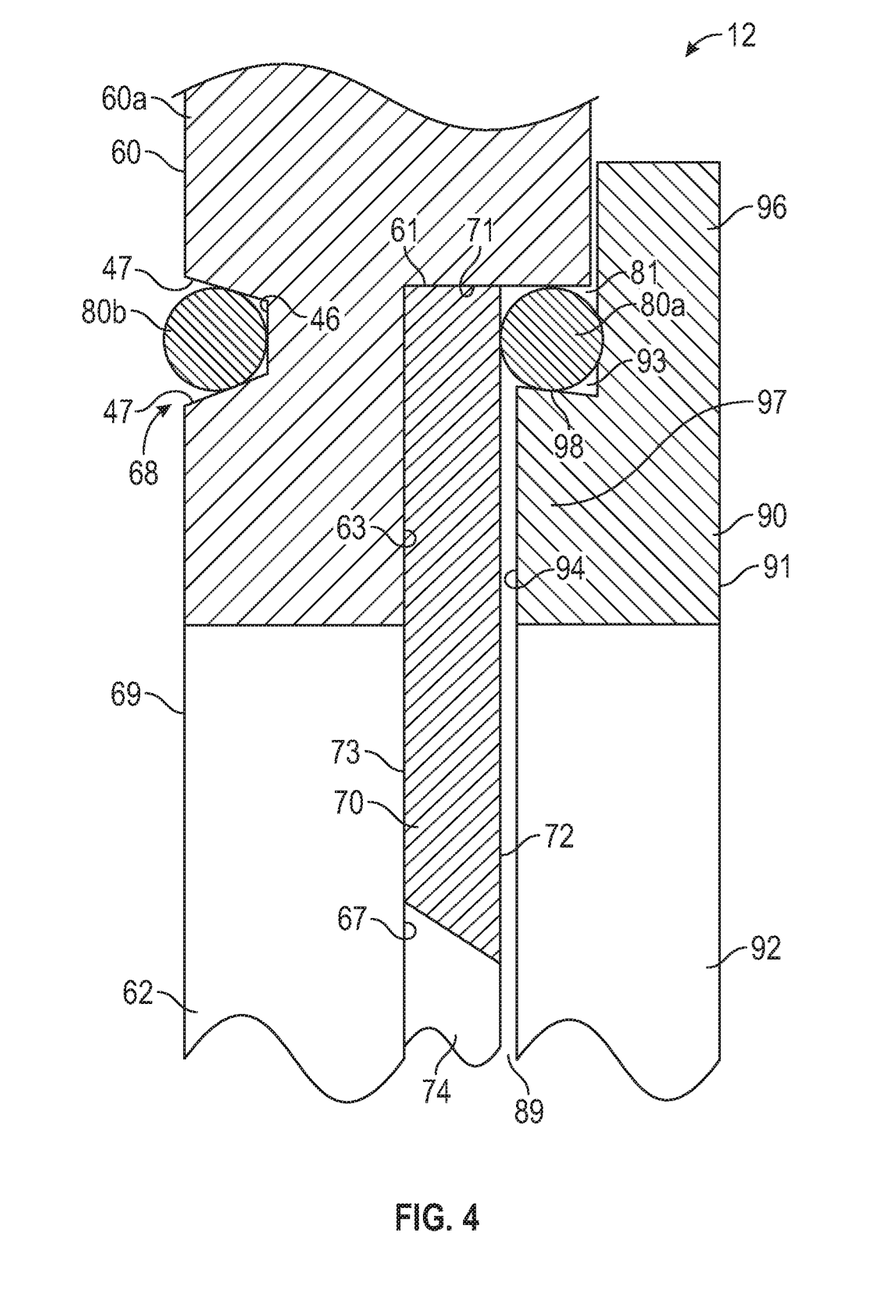
FIG. 4 is a cross-sectional view of the orifice plate assembly of FIG. 1.

Referring now to FIGS. 2 and 4, retaining ring 90 includes a central aperture 92, an annular flange 96 having a downstream facing surface 94, and an annular, axially-extending lip 97 extending from flange 96. Flange 96 and lip 97 are encircle aperture 92 and are concentric to one another to central axis 95. Central aperture 92 is sized, in this example, to have substantially the same diameter as aperture 62 of carrier 60. In some embodiments, retaining ring 90 is made of stainless steel. Retaining ring 90 is positioned in orifice plate assembly 12 such that axis 95 is aligned with orifice plate assembly central axis 15 and conduit central axis 55, and such that annular lip 97 extends within the central opening 82 of upstream o-ring seal 80a. The annular lip 97 is sized to have a maximum outer diameter that is greater than the relaxed diameter of central opening 82 of o-ring 80.

As best shown in the cross-section view in FIG. 4, in this embodiment, the radially-outermost surface 98 of annular lip 97 is not cylindrical but is instead a tapered or beveled surface relative to axis 95 and to surface 94 of the flange 96. In this way, retaining ring 90 includes an annular beveled notch 93 between lip 97 and flange 96 so as to better capture and retain o-ring seal 80a. In this exemplary embodiment, the intersection of outermost surface 98 of lip 97 with downstream surface 94 of flange 96 forms an angle that is less than ninety degrees; however an angle of ninety degrees and angles greater than ninety degrees are anticipated in alternate embodiments. In at least some embodiments, retaining ring 90 comprises metal, such as stainless steel, to provide sufficient rigidity to support the sealing contact of upstream o-ring seal 80a against orifice plate 70 and orifice plate carrier 60.

Referring again to FIGS. 2 and 4, the components of orifice plate assembly 12 are stacked face-to-face while maintaining the coaxial alignment of the central aperture of each component along axes 15, 55. Specifically, orifice plate 70 is disposed within carrier 60 so that orifice plate edge 71 faces and is adjacent to carrier rim 61, and so that downstream facing surface 73 of plate 70 abuts annular ledge 63 of the carrier 60. The coaxial alignment of axes 65, 75 and 15 is established via the close tolerances and resulting precise fit between edge 71 and rim 61, while the perpendicular orientation of upstream facing surface 72 and downstream facing surface 73, relative to flow direction 57, is established via the engagement of the planar surfaces of the carrier's annular ledge 63 and the orifice plate's downstream facing surface 73. Upstream o-ring seal 80a is disposed within carrier 60 and abuts orifice plate 70 to establish circular contact along both rim 61 of carrier 60 and the upstream facing surface 72 of orifice plate 70. Retaining ring 90 is likewise disposed with its central axis 95 in coaxial alignment with axes 65, 75, 55, and 15. The downstream facing surface 94 of flange 96 abuts against upstream o-ring seal 80a, and beveled surface 98 of lip 97 engages the inside diameter of o-ring seal 80a. O-ring seal 80a is thus retained by an upstream seal gland 81 defined by the upstream facing surface 72 of the orifice plate, the annular rim 61 of the carrier 60, the outer surface 98 of lip 97, and the downstream facing surface 94 of retaining ring 90.

Annular flange 96 of retaining ring 90 is sized, in certain embodiments, such that its overall outer diameter is greater than the diameter of the annular rim 61 of carrier body 60a, so as to extend beyond the annular lip rim 61 when orifice plate assembly 12 is assembled, as best shown in FIG. 4. Retaining ring 90 squeezes the seal 80a and thereby causes the orifice plate 70 to be pressed against the annular ledge 63 of carrier 60, with upstream O-ring seal 80a being retained within angled notch 93. That is, downstream facing surface 73 of orifice plate 70 is held against the carrier's annular ledge 63 by axial forces applied by o-ring 80a when o-ring 80a is disposed between the retaining ring 90 and plate surface 73. Similarly, retaining ring 90 is coupled to the carrier 60 by radial forces applied to retaining ring 90 by the energized o-ring 80a when the o-ring is disposed between the annular lip 97 of the retaining ring 90 and the annular rim 61 of the carrier body 60a. Due to the close dimensional tolerances and resulting tight fit between the aforementioned components, the upstream o-ring seal 80a is captured along four surfaces of seal gland 81 and establishes a seal between orifice plate carrier 60, orifice plate 70, and retaining ring 90. When upstream o-ring 80a and retaining ring 90 are coupled to carrier body 60a, a gap 89 is present between the orifice plate's upstream facing surface 72 and the adjacent surface of annular lip 97 of retaining ring 90.

FIG. 3 depicts a view of the downstream face of orifice plate assembly 12, which is on the side of orifice plate carrier 60 adjacent downstream region 56 when orifice plate carrier 60 is disposed within orifice fitting 10. As shown, parallel racks 39 are adapted to interface with lower drive 36 and upper drive 38 to enable raising and lowering of orifice plate carrier 60 within plate carrier guide 59 (FIG. 1). The downstream facing surface 69 of plate carrier 60 further includes o-ring groove 68 coaxially aligned with central axis 15. Carrier 60 is configured and is retained in fitting 10 such that its downstream facing surface 69 is perpendicular to axis 15. In this exemplary embodiment, there are a plurality of embedded markings or instructional texts 44, 45 on downstream facing surface 69 which may comprise words, letters and/or symbols and used, for example, to provide instructional guidance to users concerning fluid flow direction, installation orientation, branding, and orifice plate carrier 60 material.

Referring to FIGS. 3 and 4, downstream o-ring seal 80b includes central axis 86 which is aligned with orifice plate assembly central axis 15 and carrier axis 65. Downstream o-ring seal 80b is positioned within o-ring groove 68 that, in this embodiment, has a diameter substantially equal to the diameter of upstream seal gland 81. As shown in FIG. 4, groove 68, in cross section, includes a base surface 46 and a pair of sides 47 that may taper towards one another such that the groove 68 is narrower at the base 46 than at the groove opening. O-ring seal 80b is captured by three contacting surfaces 46 and 47 therein forming a plurality of circular sealing surfaces with groove 68. In this embodiment, seal 80b is circular in cross-section, but other embodiments may employ annular seal members that are non-circular in cross section. In at least some embodiments, downstream o-ring seal 80b comprises an elastomer, such as rubber. and is substantially identical to upstream o-ring seal 80a so that the seals 80, 80b are interchangeable. This uniformity eases assembly and reduces the number of parts that must be kept in inventory. When orifice plate assembly 12 is disposed within orifice fitting 10 in the measurement position as shown in FIGS. 3 and 4, downstream o-ring seal 80b abuts against conduit 50 along the portion that is axially adjacent to downstream region 56 so as to form a fluid seal therebetween.

The orifice plate carrier assembly 12 may be manufactured and assembled as follows. In some embodiments, an orifice plate 70 having central orifice 74 that is appropriately sized for the given application is placed into engagement with an annular ledge 63 in a carrier body 60a, the carrier body 60a having a central aperture 62 therethrough and having, on a first side, an annular rim 61 and the annular ledge 63 that extends radially inward from the annular rim 61, wherein the annular ledge 63 and annular rim 61 are disposed concentrically about the aperture 62. In some embodiments, the carrier body 60a is made through an investment casting process. A first annular elastomeric seal, such as the upstream o-ring seal 80a, is positioned about the annular lip 97 of the retaining ring 90. The annular lip 97 of the retaining ring 90 is positioned within the annular rim 61 of the carrier body 60a. The annular elastomer seal 80a may alternatively first be placed within the annular rim 61 of the carrier with the annular lip 97 of the retaining ring 90 then being disposed within its central opening 82. The first annular seal 80*a* seals between the retaining ring 90 and the carrier body 60*a* and between the retaining ring 90 and the orifice plate 70. A second annular elastomeric seal, such as the downstream seal 80*b*, is positioned in an annular groove 68 formed on the side of the carrier body 60*a* that is opposite the first side. The orifice plate carrier assembly 12 may then be placed within a meter body for measuring fluid flow there through.

Unlike the orifice plate assembly 12 described above, conventional orifice plate assemblies are complicated and difficult both to manufacture and assemble properly. Conventionally, the orifice plate assembly comprises an orifice plate carrier, in which the orifice plate is secured, with o-ring seals positioned on each side of the orifice plate and centering tabs are needed to position the plate and seal assembly within the flowbore of the fitting. A number of snap rings or clips secure the orifice plate within the orifice plate carrier and maintain the seals in proper sealing engagement with the orifice plate. Retaining the plate and seals in proper position and in a sealing relationship is difficult to achieve with the convention centering tabs, clips, and snap rings.

The design for assembly 12 described above overcomes manufacturing and assembly challenges with a simplified configuration, whereby: (1) annular rim 61 of carrier 60 mates with cylindrical edge 71 of orifice plate 70 to precisely position plate 70 at the required concentric position relative to axial flowbore 52; (2) orifice carrier assembly 12 need not employ centering tabs to properly position the orifice plate within the carrier, but relies entirely on the precision provided by the easier-to-manufacture circular ledge 63 and rim 61 of carrier 60; (3) precise perpendicular orientation of orifice plate 70 relative to flow direction 57 is established by directly abutting downstream facing surface 73 of orifice plate 70 against planar annular ledge 63 of the carrier 60; (4) sealing between orifice plate 70 and orifice plate carrier 60 is established using upstream o-ring seal 80*a* and that is retained effectively, not by numerous clips and snap rings, but by a single component—a retaining ring 90 that can be precisely manufactured and easily placed during assembly to retain seal 80*a* in sealing engagement; (5) only a single annular seal (upstream o-ring seal 80*a*) engages the orifice plate 70, the seal on the downstream side being accomplished using an annular seal 80*b* that sealing engages between the carrier 60 and an opposing surface on the orifice fitting 10.

Figure 5:
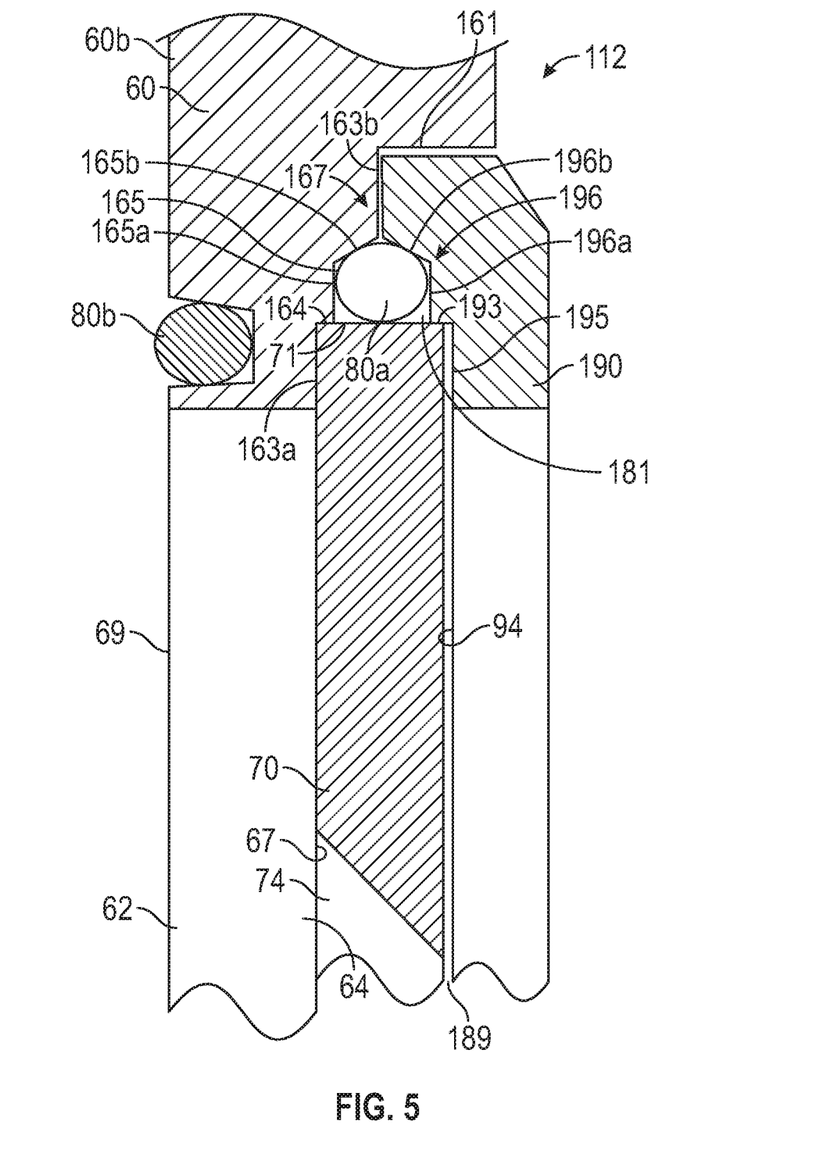
FIG. 5 is a cross-sectional view of another orifice plate assembly having an orifice plate assembly in accordance with principles described herein.

Referring now to FIG. 5, there is shown another orifice plate assembly 112 suitable for use in orifice fitting 10 in place of orifice plate assembly 12 previously described. Orifice plate assembly 112 includes a carrier 60, orifice plate 70, an upstream o-ring seal 80*a*, a retaining ring 190, and a downstream o-ring seal 80*b*, each having a through bore with a central axis aligned with central axis 15 of assembly 112 and with axis 55 of fitting 10 once installed in the fitting. The components of orifice plate assembly 112 are stacked face-to-face while maintaining the coaxial alignment of the central aperture of each component along axis 15. Orifice plate assembly 112 may be employed in any orifice fitting 10, but has particular application in fittings in which the diameter of the flow bore 52 is ten inches or larger.

Referring still to FIG. 5, in this embodiment, carrier 60 has a generally rectangular body 60*b* that includes an upstream facing surface 67, a downstream facing surface 69, a central portion 64 that is coupled between a pair of elongate legs 66, and a central aperture 62. A seal groove 68 is formed in downstream facing surface 69 concentric with aperture 62 and retains downstream o-ring seal 80*b*.

Upstream facing surface 67 of carrier body 60*b* is formed to have a radially outer annular shoulder or rim 161 and a stair step profile 167 sized to receive orifice plate 70, retaining ring 190 and upstream o-ring 80*a* as described more fully below. Upstream facing surface 67 includes an annular ledge 163*a* sized to receive orifice plate 70 and that terminates in an annular step or shoulder 164. Annular shoulder 164 is concentric to and faces edge 71 of orifice plate 70. Shoulder 164 centers plate 70 and retains it within carrier body 60*b* in the proper position. Upstream facing surface 67 further includes an annular ledge 163*b* and a seal engaging surface 165 extending between ledges 163*a,b* for sealing engagement with upstream o-ring seal 80*a*. Seal engaging surface 165 includes a first annular portion 165*a* that is generally perpendicular to carrier axis 65, and a second annular portion 165*b* that is angled or beveled relative to surface 165*a*. In this exemplary embodiment, the angle of intersection between surfaces 165*a,b* is greater than ninety degrees and may be, for example an obtuse angle of 120 degrees or more.

Downstream facing surface 94 of retaining plate 190 includes an annular ledge 195 and a seal engaging surface 196. Ledge 195 is sized to receive orifice plate 70 and terminates in an annular step or shoulder 193. Step 193 cooperates with annular step 164 on carrier body 60*b* to properly center and retain plate 70 within carrier body 60*b*. Annular ledge 195 is generally perpendicular to ring axis 95. Seal engaging surface 196 includes a first annular surface 196*a* that is generally parallel to ledge 195 and a second annular portion 196*b* that is angled or beveled relative to surface 196*a*. In this example, the angle of intersection between surfaces 196*a,b* is greater than ninety degrees and may be, for example an obtuse angle of 120 degrees or more.

In this embodiment, upstream o-ring seal 80*a* has a larger diameter than o-ring seal 80*b*, and o-ring 80*a* is positioned so that its innermost surface is disposed about and engages the outer cylindrical edge surface 71 of orifice plate 70. The relaxed, unstretched, inner diameter of upstream o-ring seal 80*a* is smaller than the outer diameter of orifice plate 70. Retaining ring 190 is sized to be retained within annular rim 161 of carrier body 60*b*, rim 161 serving as an annular shoulder for retaining and centering retaining ring 190 within carrier body 60*b*. With ring 190 positioned inside annular rim 161, seal engaging surface 196 of ring 190 is positioned opposite seal engaging surface 165 of carrier body 60*b*. Collectively, edge 71 of plate 70 and the opposing seal engaging surfaces 165, 196 form a seal gland 181 for upstream o-ring seal 80*a*. Carrier body 60*b*, retaining ring 190, o-ring 80*a* and orifice plate 70 are sized so that, once carrier assembly 112 is assembled, carrier body 60*b* and retaining ring 190 apply an axially directed force to o-ring 80*a* and ensure that o-ring 80*a* seals against both seal engaging surfaces 165, 196. Due to the close dimensional tolerances and resulting tight fit between the aforementioned components, the upstream o-ring seal 80*a* is captured within seal gland 181 and establishes a seal between orifice plate carrier body 60*b*, orifice plate 70, and retaining ring 190. When upstream o-ring 80*a* and retaining ring 190 are coupled to carrier body 60*b*, a gap 189 is present between the orifice plate's upstream facing surface 72 and the adjacent surface 194 of retaining ring 190.

Orifice plate carrier assembly 112 may be manufactured and assembled as follows. Orifice plate 70 having central orifice 74 that is appropriately sized for the given application is placed into engagement with ledge 163*a* within annular step 164 in carrier body 60b. Upstream o-ring seal 80a is positioned about edge 71 of orifice plate 70 and in engagement with seal engaging surface 165 of carrier body 60b. Retaining ring 190 is positioned within annular rim 161 of carrier body 60b, and is positioned such that: annular step 193 captures edge 71 of orifice plate 70; annular ledge 195 faces upstream facing surface 72 of plate 70; and such that seal engaging surface 196 is opposite surface 165 of carrier body 60b. Further axial movement of ring 190 toward carrier body 60b causes surfaces 165 and 196 to come into sealing engagement with o-ring 80a.

The design for assembly 112 described above overcomes manufacturing and assembly challenges over conventional assemblies with a simplified configuration, whereby: (1) annular step 164 of carrier body 60b and annular step 193 of retaining ring 190 precisely position plate 70 at the required concentric position relative to axial flowbore 52; (2) orifice carrier assembly 112 need not employ centering tabs to properly position the orifice plate within the carrier, but relies entirely on the precision provided by the easier-to-manufacture circular structures described; (3) precise perpendicular orientation of orifice plate 70 relative to flow direction 57 is established by directly abutting orifice plate 70 against planar annular ledge 163 of carrier body 60b and annular ledge 195 of retaining ring 190; (4) sealing between orifice plate 70 and orifice plate carrier 60 is established using upstream o-ring seal 80a and that is retained effectively, not by numerous clips and snap rings, but by a single component—a retaining ring 90 that can be precisely manufactured and easily placed during assembly; (5) only a single annular seal (upstream o-ring seal 80a) engages the orifice plate 70, the seal on the downstream side being accomplished using an annular seal 80b that sealing engages between the carrier 60 and an opposing surface on the orifice fitting 10.

While preferred embodiments have been shown and described, modifications thereof can be made by one skilled in the art without departing from the scope or teaching herein. The embodiments described herein are exemplary only and are not limiting. Many variations, combinations, and modifications of the systems, apparatuses, and processes described herein are possible and are within the scope of the disclosure. Accordingly, the scope of protection is not limited to the embodiments described herein, but is only limited by the claims that follow, the scope of which shall include all equivalents of the subject matter of the claims. The inclusion of any particular method step or operation within the written description or a figure does not necessarily mean that the particular step or operation is necessary to the method. The steps or operations of a method listed in the specification or the claims may be performed in any feasible order, except for those particular steps or operations, if any, for which a sequence is expressly stated. In some implementations two or more of the method steps or operations may be performed in parallel, rather than serially.

What is claimed is:

1. A flowmeter comprising:
   a meter body having a through passage for conveying fluid; and
   an orifice plate assembly disposed within the through passage of the meter body, the orifice plate assembly comprising:
      an orifice plate carrier comprising an aperture, an annular shoulder disposed about the aperture, and an annular ledge extending radially outward from the aperture toward the shoulder;
      an orifice plate disposed within the annular shoulder and comprising a first facing surface engaging the annular ledge, a second facing surface facing away from the annular ledge, and an edge surface facing the annular shoulder;
      a ring member coupled to the carrier, wherein the orifice plate is disposed between the carrier and the ring member;
      a seal gland between the carrier and the ring member and comprising an annular surface of the ring member and an annular surface of the carrier; an o-ring seal having a central opening and retained in the seal gland in sealing engagement with the carrier; and the ring member.

2. The flowmeter of claim 1 wherein the ring member comprises an annular lip and an annular flange, and wherein the annular lip intersects the annular flange in an acute angle when viewed in cross section.

3. The flowmeter of claim 1 wherein the ring member includes an annular lip, and wherein the central opening of the o-ring seal includes a relaxed diameter before the o-ring seal is in sealing engagement with the ring member, and wherein the annular lip of the ring member has a maximum outer diameter that is greater than the relaxed diameter of the central opening of the o-ring.

4. The flowmeter of claim 1 wherein the ring member is coupled to the carrier by radial forces applied to the ring member by the o-ring seal when the o-ring seal is disposed between the ring member and the carrier.

5. The flowmeter of claim 1 wherein the seal gland is formed by the orifice plate, the annular shoulder of the carrier, and the ring member, and wherein the seal gland includes at least one acute angle when viewed in cross section.

6. The flowmeter of claim 5 wherein the first facing surface of the orifice plate is held against the annular ledge by axial forces applied by the o-ring seal when the o-ring seal is disposed in the seal gland.

7. The flowmeter of claim 1 wherein the edge surface of the orifice plate has an outer diameter that is greater than the diameter of the aperture of the carrier, and less than the diameter of the annular shoulder of the carrier.

8. A flowmeter comprising:
   a meter body having a through passage for conveying fluid; and
   an orifice plate assembly disposed within the through passage of the meter body, the orifice plate assembly comprising:
      an orifice plate carrier comprising an aperture, an annular shoulder disposed about the aperture, and an annular ledge extending radially outward from the aperture toward the shoulder;
      an orifice plate disposed within the annular shoulder and comprising a first facing surface engaging the annular ledge, a second facing surface facing away from the annular ledge, and an edge surface facing the annular shoulder;
      a ring member coupled to the carrier, wherein the orifice plate is disposed between the carrier and the ring member;
      a seal gland between the carrier and the ring member and comprising an annular surface of the ring member and an annular surface of the carrier; an o-ring seal having a central opening and retained in the seal gland in sealing engagement with the carrier; and the ring member; and wherein the ring member further includes an annular flange and an annular lip that extends from the annular flange towards the orifice plate, and wherein a gap is present between the second facing surface of the orifice plate and the annular lip.

9. The flowmeter of claim 1 wherein the carrier is formed by investment casting.

10. The flowmeter of claim 1 wherein the carrier further comprises a first side and a second side, wherein the annular ledge is formed on the first side, and wherein the second side of the carrier includes an annular groove configured to receive an annular seal.

11. The flowmeter of claim 1 wherein the ring member comprises an annular flange and an annular lip extending from the flange, the ring member positioned such that the annular lip extends within the central opening of the o-ring seal; and wherein the o-ring seal is retained between the second facing surface of the orifice plate, the annular lip of the ring member, the annular flange of the ring member, and the annular shoulder of the carrier.

12. The flowmeter of claim 1 wherein the seal gland includes surfaces that form at least one obtuse angle when viewed in cross section.

13. An orifice plate carrier assembly comprising:
a carrier body comprising an aperture, an annular shoulder disposed about the aperture, and an annular ledge extending radially outward from the aperture toward the shoulder;
an orifice plate disposed within the annular shoulder and comprising a first facing surface engaging the annular ledge, a second facing surface facing away from the annular ledge, and an edge facing the annular shoulder;
a ring member coupled to the carrier, wherein the orifice plate is retained between the carrier and the ring member;
a first annular seal disposed within an annular seal gland between the carrier and the ring member, the first annular seal having a central opening and having a first portion engaging the orifice plate, a second portion engaging the carrier, and a third portion engaging the ring member.

14. The orifice plate carrier assembly of claim 13 wherein the ring member comprises an annular flange and an annular lip extending from the annular flange, the ring member positioned such that the annular lip is disposed within the central opening of the first annular seal; and wherein the first annular seal is retained within an annular seal gland defined by the second facing surface of the orifice plate, the annular lip of the ring member, the annular flange of the ring member, and the annular rim of the carrier.

15. The orifice plate carrier assembly of claim 13 wherein, when viewed in cross section, the seal gland includes at least one acute angle.

16. The orifice plate carrier assembly of claim 14 wherein the annular lip of the ring member includes an outer diameter, and wherein the first annular seal is elastomeric with the central opening defining a relaxed diameter before the annular lip is disposed into the central opening, and wherein the outer diameter of the annular lip is greater than the relaxed diameter of the central opening of the first annular seal.

17. The orifice plate carrier assembly of claim 14 wherein the annular flange of the ring member extends beyond the annular shoulder of the carrier body.

18. The orifice plate carrier assembly of claim 14 wherein the annular lip of the ring member includes an outer diameter, and wherein the outer diameter of the ring member is less than the outer diameter of the orifice plate.

19. The orifice plate carrier assembly of claim 13 wherein the carrier body comprises a first side and a second side and the annular ledge is formed on the first side, and wherein the carrier assembly further comprises:
a second annular seal disposed in an annular seal groove formed on the second side of the carrier body and having a groove diameter.

20. The orifice plate carrier assembly of claim 19 wherein the diameter of the annular seal groove is generally equal to the diameter of the annular seal gland.

21. The orifice plate carrier assembly of claim 13 wherein the ring member includes an outer cylindrical surface, and wherein the seal member engages the outer cylindrical surface, and at least one annular surface of the ring member, and at least one annular surface of the carrier.

22. The orifice plate carrier assembly of claim 21 wherein the seal gland includes surfaces that form at least one obtuse angle when viewed in cross section.

23. A method of making an orifice plate carrier comprising:
placing an orifice plate into engagement with an annular ledge in a carrier body, the carrier body having an aperture therethrough and having, on a first side, an annular rim and the annular ledge that extends radially inward from the annular rim, wherein the annular ledge and annular rim are disposed concentrically about the aperture;
positioning a first annular elastomeric seal about an annular lip of a ring member;
positioning the annular lip of the ring member within the annular rim of the carrier body;
using the first annular seal, sealing between the ring member and the carrier body and between the ring member and the orifice plate;
positioning a second annular elastomeric seal in an annular groove on a second side of the carrier body opposite the first side.

* * * * *